United States Patent
Kawan et al.

(10) Patent No.: US 11,416,923 B1
(45) Date of Patent: *Aug. 16, 2022

(54) SYSTEM, METHOD AND APPARATUS FOR VALUE EXCHANGE UTILIZING VALUE-STORING APPLICATIONS

(71) Applicant: CITICORP CREDIT SERVICES, INC. (USA), Long Island City, NY (US)

(72) Inventors: Joseph C. Kawan, Hollywood, CA (US); Ramiro Munoz, Santa Monica, CA (US); Mark Kogen, Lawndale, CA (US)

(73) Assignee: CITICORP CREDIT SERVICES, INC., Long Island City, NY (US)

( * ) Notice: Subject to any disclaimer, the term of this patent is extended or adjusted under 35 U.S.C. 154(b) by 976 days.

This patent is subject to a terminal disclaimer.

(21) Appl. No.: 16/160,218

(22) Filed: Oct. 15, 2018

Related U.S. Application Data

(63) Continuation of application No. 13/338,841, filed on Dec. 28, 2011, now Pat. No. 10,102,569, which is a
(Continued)

(51) Int. Cl.
G06Q 40/00 (2012.01)
G07F 7/08 (2006.01)
(Continued)

(52) U.S. Cl.
CPC ........... *G06Q 40/00* (2013.01); *G06Q 20/105* (2013.01); *G06Q 20/3572* (2013.01); *G06Q 20/363* (2013.01); *G07F 7/0866* (2013.01)

(58) Field of Classification Search
CPC ....... G06Q 40/00; G06Q 20/10; G06Q 20/105
(Continued)

(56) References Cited

U.S. PATENT DOCUMENTS

| | | |
|---|---|---|
| 4,650,981 A | 3/1987 | Foletta |
| 4,795,898 A | 1/1989 | Bernstein et al. |

(Continued)

FOREIGN PATENT DOCUMENTS

| | | |
|---|---|---|
| EP | 0836731 A1 | 4/1998 |
| WO | 99/34326 A1 | 7/1999 |

OTHER PUBLICATIONS

Fehr, S. C. (Nov. 27, 1994). For commuters on the go, a new way to pay metro: [FINAL edition]. The Washington Post (Pre-1997 Fulltext) Retrieved from https://dialog.proquest.com/professional/docview/307806935?accountid=131444 (Year: 1994).*

(Continued)

*Primary Examiner* — Hani M Kazimi
(74) *Attorney, Agent, or Firm* — Foley & Lardner LLP

(57) ABSTRACT

A system, method and apparatus for exchanging value using a smart card in a financial transaction is disclosed. The system includes a smart card having a contact interface and a contactless interface interactive with a closed purse application and an open purse application controlled by a microprocessor. The closed purse application contains application-specific value, while the open purse contains general value. The application-specific value and general value are each compatible within the system of the invention to perform and settle the financial transaction. The financial transaction may include the smart card communicating with a load terminal or a transaction terminal to add or change the amount of value on the smart card. Further, the present invention include auto-load functionality for adding an amount of value to the smart card. Finally, applications such as a transportation application and a loyalty application are described.

20 Claims, 4 Drawing Sheets

Related U.S. Application Data continuation of application No. 09/276,823, filed on Mar. 26, 1999, now Pat. No. 8,108,307.

(60) Provisional application No. 60/119,230, filed on Feb. 9, 1999, provisional application No. 60/079,802, filed on Mar. 30, 1998.

(51) Int. Cl.
  *G06Q 20/36* (2012.01)
  *G06Q 20/34* (2012.01)
  *G06Q 20/10* (2012.01)

(58) Field of Classification Search
  USPC ............... 705/39–42; 235/379, 380, 492
  See application file for complete search history.

(56) References Cited

U.S. PATENT DOCUMENTS

| | | | |
|---|---|---|---|
| 4,859,837 A | 8/1989 | Halpern | |
| 4,973,828 A | 11/1990 | Naruse et al. | |
| 4,977,501 A | 12/1990 | Lefevre | |
| 5,157,247 A | 10/1992 | Takahira | |
| 5,206,495 A | 4/1993 | Kreft | |
| 5,412,192 A | 5/1995 | Hoss | |
| 5,477,215 A | 12/1995 | Mandelbaum | |
| 5,478,993 A | 12/1995 | Derksen | |
| 5,484,997 A | 1/1996 | Haynes | |
| 5,530,232 A | 6/1996 | Taylor | |
| 5,557,516 A | 9/1996 | Hogan | |
| 5,578,808 A | 11/1996 | Taylor | |
| 5,594,233 A | 1/1997 | Kenneth et al. | |
| 5,598,032 A | 1/1997 | Fidalgo | |
| 5,619,529 A | 4/1997 | Fujioka | |
| 5,649,118 A | 7/1997 | Carlisle et al. | |
| 5,652,423 A | 7/1997 | Yaginuma | |
| 5,671,525 A | 9/1997 | Fidalgo | |
| 5,734,722 A | 3/1998 | Halpern | |
| 5,767,503 A | 6/1998 | Gloton | |
| 5,773,812 A | 6/1998 | Kreft | |
| 5,844,218 A | 12/1998 | Kawan et al. | |
| 5,856,912 A | 1/1999 | Miller et al. | |
| 5,874,725 A | 2/1999 | Yamaguchi | |
| 5,884,292 A | 3/1999 | Baker et al. | |
| 5,892,211 A | 4/1999 | Davis et al. | |
| 5,901,303 A | 5/1999 | Chew | |
| 5,912,453 A | 6/1999 | Gungl et al. | |
| 5,929,414 A * | 7/1999 | Saitoh ................. | G06K 7/0021 235/441 |
| 5,991,748 A | 11/1999 | Taskett | |
| 5,999,596 A | 12/1999 | Walker et al. | |
| 6,003,014 A * | 12/1999 | Lee ...................... | G06Q 20/367 705/13 |
| 6,014,648 A | 1/2000 | Brennan | |
| 6,038,549 A | 3/2000 | Davis et al. | |
| 6,047,267 A | 4/2000 | Owens et al. | |
| 6,076,075 A | 6/2000 | Teicher | |
| 6,097,292 A | 8/2000 | Kelly et al. | |
| 6,168,083 B1 * | 1/2001 | Berger .............. | G06K 19/07769 235/492 |
| 6,480,101 B1 | 11/2002 | Kelly et al. | |
| 6,727,802 B2 | 4/2004 | Kelly et al. | |
| 7,075,411 B2 | 7/2006 | Kelly et al. | |
| 7,127,413 B1 | 10/2006 | Yanagisawa et al. | |
| 7,705,712 B2 | 4/2010 | Kelly et al. | |
| 10,102,569 B1 | 10/2018 | Kawan et al. | |
| 2002/0019807 A1 * | 2/2002 | Halpern ........... | G06K 19/07703 705/40 |

OTHER PUBLICATIONS

Amdur, European Banks Play Their (Smart) Cards, BYTE Magazine, Apr. 1997, http://www.byte.com/art/9704/sec18/art1.htm, accessed Aug. 25, 1999, 7 pages.

Asian Bank Puts Salaries on Smart Cards, ICL Press Release, Mar. 19, 1999, http://www.icl.com/news/press/march99/19mar99.htm, accessed Nov. 4, 1999, 3 pages.

Attoh-Okine, Security Issues of Emerging Smart Cards Fare Collection Application in Mass Transit, Pacific Rim TransTech Conference, 1995 Vehicle Navigation and Information Systems Conference Proceedings, 6th International VNIS, A Ride into theFuture, (Cat. No. 95CH35776), pp. 523-526, Published: New York, NY, USA, 1995.

Back to Barter in Russia, ICL Press Release, May 27, 1999, http://www.icl.com/news/press/may99/27may99.htm, accessed Nov. 4, 1999, 2 pages.

Block, Lufthansa Using Smart Card that Eliminates Some Domestic Travelers' Need for Tickets, American Banker, Feb. 21, 1996, p. 12, vol. 161, No. 33.

Cunningham, Smart Card Applications in Integrated Transit Fare, Parking Fee and Automated Toll Payment Systems—the MAPS Concept, Conference Proceedings, National Telesystems Conference 1993, Commercial Applications and Dual-Use Technology, (Cat. No. 93CH33 18-3), pp. 21-25, Published: New York, NY, USA, 1993.

Embedded Systems, Product Report, Smart Cards, EDTN Network, http://www.edtn.comlembedsys/embp012.htm, accessed Sep. 9, 1999, 4 pages.

Flohr, The Smartcard Invasion, BYTE Magazine, Jan. 1998, http://www.byte.com/art/9801/sec5/art14.htm accessed Aug. 25, 1999, 3 pages.

Gemplus and Siemens Introduce Combicard, Gemplus Press Release, May 20, 1997, http://pluton.gemplus.fr/ns-search/presse/combicard.html, accessed Aug. 25, 1999, 2 pages.

Goto, A New Railway Ticket System Using Contactless IC Cards, Rail International, Feb. 1994, pp. 26-30, vol. 25, No. 2.

Lamb, Seimens vs. Racom: Two Approaches to Dual-Interface Smart Cards, The Race Between EEPROM and FRAM is on, Report on Smart Cards, Jun. 3, 1996, http://www.racom.com/rsc_excl.htm, 7 pages.

Lent, The Electronic Purse: A New and Economical Means of Payment for Public Transport, Signal and Draht, May 1993, pp. 143-147, vol. 85, No. 5.

Mathieu, Multi-Service/Multi-Providers Remote Ticketing on the Marseille Metropolitan Area, Steps Forward, Proceedings of the Second World Congress on Intelligent Transport Systems '95 Yokohama, pp. 2221-2222, vol. 5, Published: Tokyo, Japan, 1995.

Matukawa et al., Automatic Passenger Gate System Using Contactless IC Card, Transactions of the Institute of Electrical Engineers of Japan, Part C, May 1995, pp. 634 643, vol. 115-C, No. 5.

New Riverside University Dictionary, 1984, Riverside Publishing Company, pp. 118-119, 524, and 1275.

O'Mahony, Donal et al., Electronic Payment Systems, 1997, Artech House, pp. 208-212.

O'Sullivan, From France, A Glimpse of Things to Come [Electronic Purse], ABA Banking Journal, Mar. 1997, pp. 57-58,60,62,69, vol. 89, No. 3.

Pathways Announces Smart Card Toolkit: 'E-Bank,' Card Handler and Multiple Purse/Multiple Application Functions Featured, PR Newswire, Sep. 2, 1997, 3 pages.

Quittner, Mastercard to Pilot-Test Business Chip Card with Ticketless-Travel Feature, American Banker, Jul. 16, 1997, p. 17, vol. 162, No. 135.

Rainio, Smart Card Provides Ticket to Ride, ID Systems European Edition, Feb. 1997, pp. 14, vol. 5, No. 2, vol. 16-17.

Rigney, Ed., 1998 Advanced Card Technology Sourcebook, Faulkner & Gray 1997, pp. 106-117 and 121-122.

Tomkowiak et al., A Computer in Your Wallet, Byte Magazine, Jun. 1996, http://www.byte.com/art/9606/sec17/art4.html, accessed Aug. 25, 1999, 6 pages.

Visa International Launches Major Smart Card Program in Leading Shopping and Entertainment District in Tokyo PR Newswire Jul. 15, 1998, 4 pages.

* cited by examiner

SYSTEM, METHOD AND APPARATUS FOR VALUE EXCHANGE UTILIZING VALUE-STORING APPLICATIONS

CROSS-REFERENCE TO RELATED APPLICATIONS

This application is a continuation application of U.S. patent application Ser. No. 13/338,841, filed Dec. 28, 2011, which is a continuation application of U.S. patent application Ser. No. 09/276,823, entitled "System, Method and Apparatus for Value Exchange Utilizing Value-Storing Applications," filed Mar. 26, 1999, which claims the benefit of Provisional Application No. 60/079,802, filed Mar. 30, 1998 and Provisional Application No. 60/119,230, filed Feb. 9, 1999, all of which are hereby incorporated by reference in their entirety.

FIELD OF THE INVENTION

The present invention relates to financial transaction systems, and more particularly, to a system and method for transferring value using compatible, electronic value-storing applications.

BACKGROUND OF THE INVENTION

The use of smart cards is increasing in today's consumer-oriented society. A smart card or integrated chip (IC) card is a transaction card, similar in size and appearance to credit card, that contains a microcomputer chip. Traditional smart cards have a contact interface, such as a metallic contact pad, that is used to communicate between the microcomputer on the card and a reader/writer device (RWD) into which the card is inserted. Thus, traditional smart cards require a physical connection to a RWD in order to be utilized.

The use of smart card technology in the consumer environment places a high physical demand on the card and the contact interface, making the required physical connection undesirable at times. For example, since the metallic contact plate is exposed to the environment, it is often subject to oxidation, contamination and other physical degradation due to use. This can decrease the reliability of the physical connection.

Additionally, the requirement of a physical connection for communications is often undesirable in environments where speed and high throughput are demanded. For example, a smart card may be used to store value or electronic tokens for mass transit. To use a traditional smart card, each passenger needs to take the time to properly orient the card and insert it into a RWD that collects a fare. Further, the rate of data transmission through the physical connection upon proper insertion of the card is relatively slow compared to contactless data transmission speeds. Thus, a traditional smart card requiring a physical connection for data transmission is often cumbersome and slow.

On the other hand, even though the contact interface provides a slower communications channel, it does have some other advantages. A contact interface is very common and only requires an inexpensive reader interface. The inexpensive reader interface is readily connected to a home computer, for example, thereby increasing the utility of a card that has a common contact interface. Hence, in order to integrate a smart card having new technology into the commercial world, it is prudent to provide a smart card that is compatible with current contact interface devices. Thus, efforts have been made to overcome the disadvantages of the traditional smart card having a contact interface by adding an additional contactless interface to the card.

Current smart cards having both a contact interface and a contactless interface, however, have a number of disadvantages. For example, one representative contact and contactless interface smart card disadvantageously comprises a shared memory configuration. This smart card has a traditional microprocessor chip with logic to control a contact interface. The contactless interface is also included in the card, but it is a separate function that has its own logic. The contactless interface utilizes an Application Specific Integrated Circuit (ASIC), that has limited computational capability because it is designed specifically for one application. Generally, the ASIC is hard-wired to perform computations specific to the application programmed on the main microprocessor on the prior art card. As such, the ASIC is reasonably secure but it has no capability to perform higher order security algorithms, such as the triple-DES (Data Encryption Standard) symmetric-key encryption algorithm. The ASIC is essentially dumb program logic that cannot be readily adapted to other applications. Thus, the flexibility of running various applications using this prior art card is severely limited because the contactless interface is inflexible and only communicates with the main microprocessor chip through shared memory locations.

Also, current smart cards typically utilize an open purse application to transfer and store value. Examples of open purse applications are VISA CASH® and Mondex® payment systems. An open purse application allows value to be transferred to and from the smart card, making utilization of the smart card for a transaction very similar to utilizing cash. For example, when using a smart card open purse application to make a purchase, the card holder simply inserts the card into a RWD. The RWD allows the card to communicate with a merchant terminal, for example. The terminal and card authenticate each other, then the transaction amount is debited from the card and credited to the terminal. In turn, the terminal forwards the transaction information to a settlement system, which properly credits the merchant account and debits the pool of money associated with transferring the value onto the smart card. Unlike a credit card transaction, for example, the value transfer occurs in a matter of seconds and no receipt needs to be signed. Hence, the value stored in the open purse of a smart card is like cash, because it is generic value and can be used at any location that supports the particular open purse application. In the United States, for example, the VISA CASH® open purse application and settlement system is being accepted by an ever-increasing number of merchants. An open purse application, therefore, becomes more open and the value becomes more generic and like cash with the increased acceptance and use of the application. Thus, open purse applications can be very powerful methods of transferring value, giving a smart card the ability to look and act like cash.

Open purse applications can be risky, however, because of their similarity to cash. The load key, or the encrypted data utilized to authorize and load value into the open purse application on a smart card, must be closely guarded. Typically, load keys are kept on host system computers or at highly-secure remote terminals or load devices (e.g. in the Mondex® system). If the load key were to be stolen, then the owner of the load key, such as a financial institution, has a great exposure to fraud as the stolen load key could be used to improperly add value to a smart card. The improperly added value on the smart card could then be used to perform transactions, just like cash. Thus, it may be desirable to have a closed purse application that limits the ability to load and/or unload value on the smart card.

Although a closed purse application may be helpful to control the transfer of value, typical closed purse applications are too limiting. Closed purse applications are application-specific, only allowing their value to be used in specific transactions approved by the application. This may be advantageous in certain closed environments, but generally a consumer does not find this type of restriction helpful. Thus, a closed purse application does not give the consumer as many options as the consumer would like.

Therefore, a transaction system is desired that overcomes the problems of the open and closed purse applications, and also a smart card having both a contact and contactless interface that overcomes the above problems is desired.

SUMMARY OF THE INVENTION

According to the present invention, a system for performing a financial transaction to exchange value comprises a first electronic application for storing application-specific value and a second electronic application for storing general value, where the application-specific value and the general value are each compatible within the system to perform the financial transaction. The compatibility is achieved by formatting the financial transaction to be compatible with a common settlement system, such as a settlement system associated with the second electronic purse. The financial transaction may be performed utilizing a transaction application, which may be part of or associated with the first electronic application. The financial transaction may involve the exchange of all or a portion of either the application-specific value or the general value, or both. Further, the invention additionally comprises an auto-load application that adds new application-specific or general value to the first electronic application or second electronic application, respectively. The auto-load application exchanges general value for application-specific value, or it exchanges value for a debit to an associated, outside account. Finally, the system also includes at least one communication interface for interacting with the first and second electronic applications. The communication interface may include a contact interface, a contactless interface or both.

The above-described features of the system of the present invention may be embodied in a smart card that has a memory including the first and second electronic applications. The memory of the smart card is interactive with the at least one communication interface, as well as with a dual interface microprocessor that implements the purse, transaction and other applications of the present invention. Additionally, the system includes a first terminal for loading value into the first or second applications and a second terminal for deducting value from these applications.

One disclosed method for performing a financial transaction with a smart card comprises storing application-specific value in a first electronic application, storing general value in a second electronic application, and performing a value exchange associated with the financial transaction wherein the application-specific value and the general value are each exchangeable in the financial transaction. The financial transaction involves exchanging at least a portion of one of the application-specific value and the general value to perform the transaction, or exchanging at least a portion of both the application-specific value and the general value to perform the transaction. The method further includes formatting the financial transaction performed with application-specific value for utilization with a settlement system associated with the second electronic application. Also, the method includes transferring at least one of the application-specific value and the general value through a communication interface in communication with at least one of the first electronic application and the second electronic application. Performing the value exchange includes utilizing a transaction application, that may be stored on a smart card or on a transaction terminal. Additionally, the method includes exchanging all of the application-specific value, automatically loading new application-specific value, and exchanging at least a portion of the new application-specific value to complete the financial transaction.

In another embodiment, the present invention is a system for performing a financial transaction that includes a smart card storing value and a purchase device for removing value from the smart card. The smart card includes a memory for storing a first application having application-specific value and a second application having general value. The application-specific value and the general value are compatible for performing the financial transaction and are secured by encryption on the smart card. The purchase device includes a first purchase key for use in removing application-specific value from the first application and a second purchase key for use in removing general value from the second application. Both the first and second purchase keys are security mechanisms for accessing encrypted information, such that the purchase device is adapted for communication with the smart card to transfer at least one of the application-specific value and the general value in the financial transaction. Also, the first application generates a first set of transaction information, including the application-specific value, and the second application generates a second set of transaction information, including the general value, for use in the financial transaction. The invention includes the first set of transaction information being formatted for processing like the second set of transaction information. Additionally, this system includes a funding source for receiving funds in exchange for transferring at least one of the application-specific value and the general value to the smart card. Also, the system includes a settlement system for accounting for the flow of application-specific value and general value among the smart card and the purchase device in order to settle the financial transaction.

DETAILED DESCRIPTION OF THE INVENTION

Figure 1:
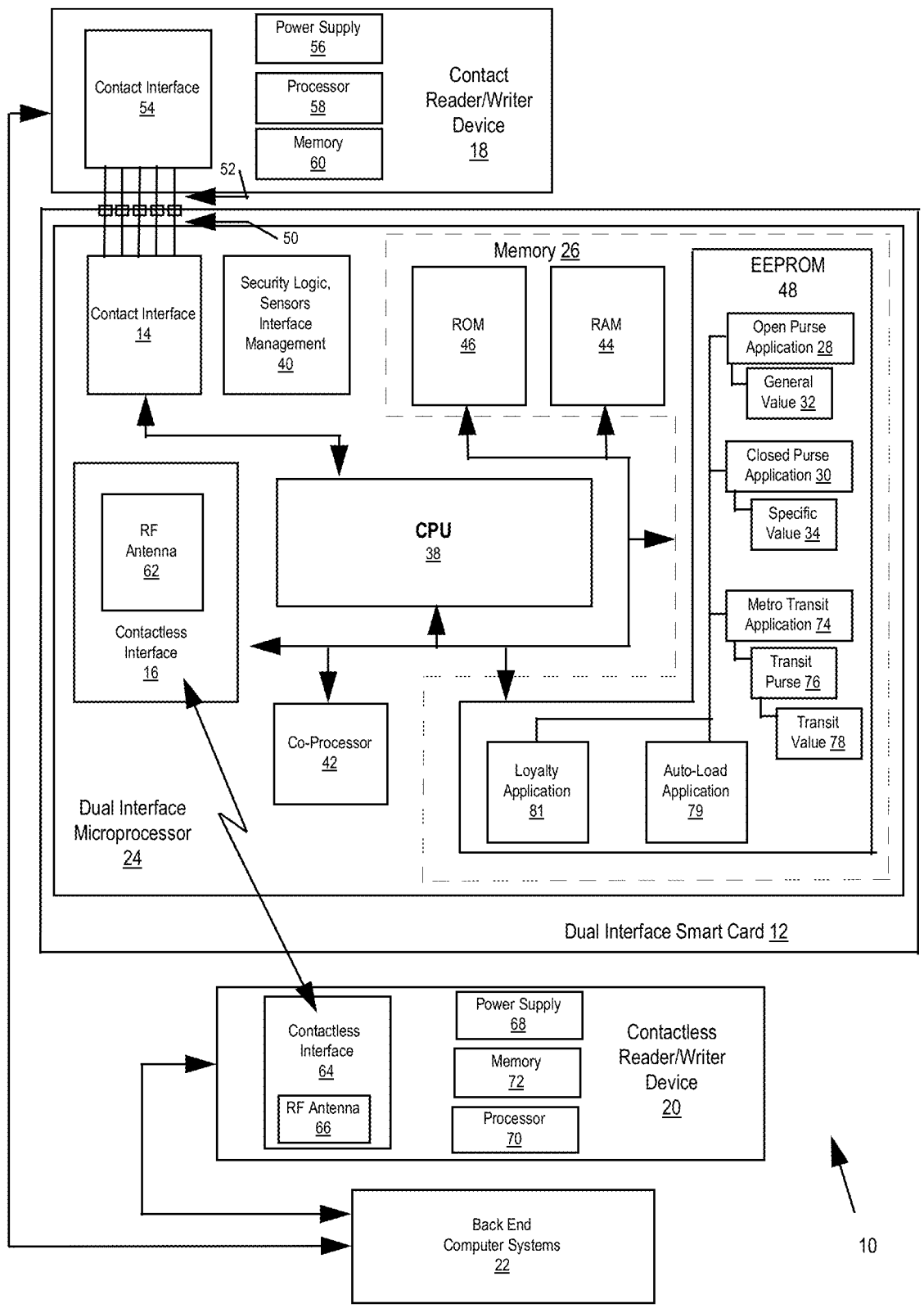
FIG. 1 is a schematic representation of the system of the present invention.
Figure 2:
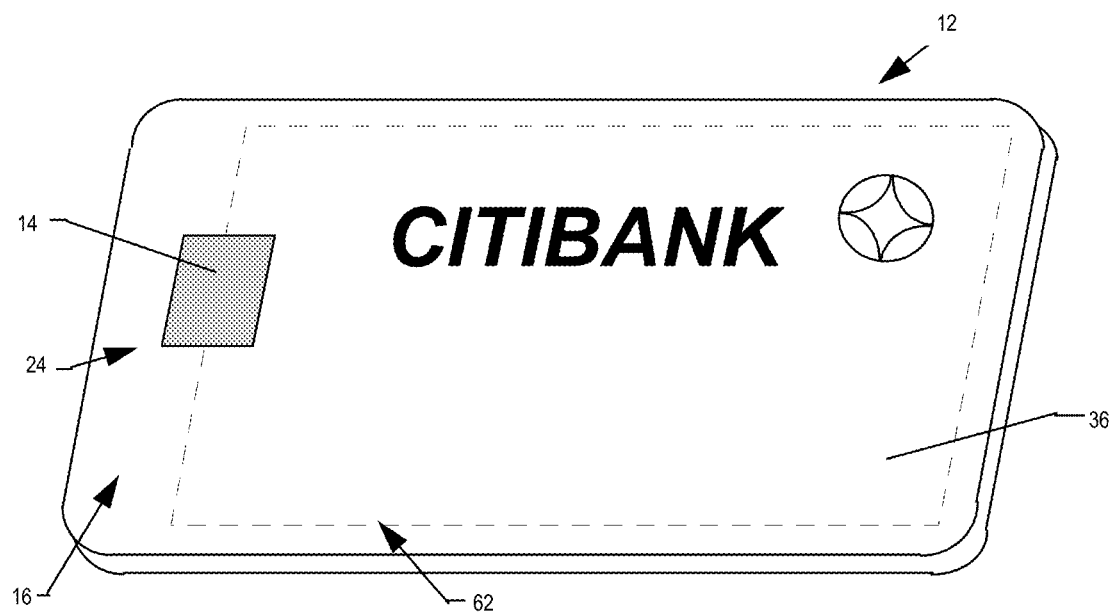
FIG. 2 is perspective view of one embodiment of a dual interface smart card.

According to a preferred embodiment of the present invention, referring to FIGS. 1 and 2, a system 10 for exchanging value comprises a dual interface smart card 12 having a contact interface 14 and a contactless interface 16 in communication with an external contact reader/writer device (RWD) 18 and an external contactless reader/writer device (RWD) 20, which may each be in communication with back end computer systems 22. Both contact interface 14 and contactless interface 16 are interactive with dual interface microprocessor 24, which contains the functionality to communicate with each interface. Dual interface microprocessor 24 further comprises memory 26 for storing data and application programs. Memory 26 comprises application programs such as an open purse application 28 and a closed purse application 30 that allow for controlling an exchange of value through either contact interface 14 or contactless interface 16. Open purse application 28 enables the exchange of general value 32, while closed purse application 30 enables the exchange of application-specific value 34. Thus, dual interface card 12 utilizes dual interface microprocessor 24 to control the exchange of value from open purse 28 and closed purse 30 through contact interface 14 and contactless interface 16.

The term "general value" comprises value that is generally equivalent to cash in that the general value is readily accepted in a plurality of financial transactions. The term "application-specific value" comprises value that has limited acceptance, typically only for transactions associated with a specific application loaded onto the smart card. General value may be accessed by a specific application program and converted into application-specific value. Similarly, application-specific value may be able to be converted to general value. Alternatively, certain applications may limit or prohibit the conversion of their associated application-specific value to general value, such as entitlement program applications. Thus, while general value and application-specific value may be readily exchanged, the specific application program may provide specific rules governing the limits of the exchange.

Also, the term "purse" as used in this application refers to an application programmed within the memory of the smart card that stores and transfers value. There may be a plurality of purses within each smart card.

Back end computer systems 22 comprise all communications and processing services necessary to complete, settle, report and manage the transaction and the support services required to maintain system integrity. As examples, these services include but are not limited to: terminal acquisition and processing (both purchase and load); funds authorization and load authentication services; network communications, including communications concentrators, protocol converters, and interchange networks; clearing, settlement and funds movement processing and reporting; card management, security services and device and asset management and maintenance.

Dual interface smart card 12 is similar to a traditional transaction card, like a credit card, debit card, etc. Dual interface smart card 12 is thin, portable and easily carried in a wallet or pocket. The above-mentioned components of dual interface smart card 12 may be encapsulated within substrate 36, or alternatively laminated between layers of the substrate, such as a plastic or the like.

Dual interface microprocessor 24, in combination with contact interface 14 and contactless interface 16, comprise interface circuitry that advantageously provides smart card 12 with an integrated contact and contactless functionality. Dual interface microprocessor 24 further includes a central processing unit (CPU) 38 that manages data and runs application programs, security logic, sensors and interface management applications 40, and a co-processor 42 that provides additional processing capability. For example, co-processor 42 may be a Triple-DES (Data Encryption Standard), a crypto-public key (PK) co-processor, or other similar encryption co-processor that provides security for communications utilizing both contact interface 14 and contactless interface 16. Also, memory 26 may comprise memory units in the form of random-access memory (RAM) 44, read-only memory (ROM) 46 and electrically-erasable programmable read-only memory (EEPROM) 48. CPU 38 and memory 26 are capable of respectively processing and storing data and signals representative of algorithms, such as software programs. A suitable dual interface microprocessor 24 having the above-mentioned components is the MIFARE® PRO microprocessor manufactured by Philips Semiconductors. Also, a similar dual interface chip is available from Siemens. Dual interface microprocessor 24 runs on 5 volts or less of electricity, which may be provided through external sources, as is described below.

Dual interface microprocessor 24 advantageously comprises algorithms and software applications that may be utilized with either contact interface 14 or contactless interface 16. Dual interface microprocessor 24 operates under firmware controlled by its internal read-only memory and formats data and interprets commands between contact interface 14 and contactless interface 16. Dual interface microprocessor 24 beneficially allows the same firmware and software applications to be utilized in conjunction with either contact interface 14 or contactless interface 16. Utilization of the same application advantageously eliminates the need for separately programmed applications for each interface to perform the same function, saving space within memory 26 and reducing the cost of supplying card 12 with operating applications.

Contact interface 14 manages the data communication between CPU 38 and contact RWD 18. Contact interface 14 preferably comprises a plurality of electrically-conducting contact plates 50 that provide a connection for input/output communications with dual interface microprocessor 24. Contact plates 50 are adapted to mate with a corresponding contact connector 52, such as electrically-conducting prongs or plates, coupled to contact interface 54 on contact RWD 16. Details concerning the specifications for such a contact interface are found in International Standards Organization (ISO) standard number ISO 7816. Thus, data and signals are transferred between smart card 12 and contact RWD 18 through the electrical connection established by mating contact plates 50 and contact connector 52.

Use of contact interface 14 advantageously provides a secure communication channel, as microprocessor 24 includes secret keys and encryption algorithms to protect access to CPU 38 and memory 26. In communicating with contact RWD 18 through contact interface 14, microprocessor 24 performs verification and authorization algorithms to insure the communication with the contact RWD is proper. A typical contact-to-contact connection, such as between contact interface 14 and contact interface 54, allows data transfer at a rate of about 9.6 kilobits (kb) per second. Contact interface 14 is preferably used to load value and application programs onto card 12, such as through local terminals and home computers connected to a contact RWD 18. Contact interface 14 is generally preferred over contactless interface 16 for loading value because of the long transaction times. For secure processing, such as is required for loading value, the keys are longer and thus require a transaction time for key interchange and transaction data interchange. As such, the reliability of the communication channel provided by contact interface 14 is desired. Additionally, one of the plurality of contact plates 50 of contact interface 14 may be connected to circuitry that powers microprocessor 24 from a power supply 56 associated with contact RWD 18. Further, contact RWD 18 may include a processor 58 and a memory 60 for processing and storing electrical signals and data representative of algorithms and applications.

Similarly, contactless interface 16 manages the data communication between CPU 38 and contactless RWD 20. Advantageously providing a relatively fast communications interface compared to contact interface 14, contactless interface 16 advantageously transfers data at a rate of about 106 kb per second. This high data transmission rate is desirable in applications requiring the communication between card 12 and the external contactless RWD 20 to be completed in a very short time period, such as with transportation-related applications like fare or toll collection. Although contactless interface 16 offers high speed, it is typically not used for loading value onto the card because of the long transaction times. Even though the communications are faster, contactless interface 16 is typically not fast enough to transfer the secure information and transaction data that is passed by contact interface 14 in a normal contactless transaction time. A contactless transaction time begins when the card is in proximity of contactless terminal, and is completed in the amount of time it takes to touch the card to a designated spot on the terminal. Also, the reliability of a long, contactless communication may be jeopardized by deflecting the card at an angle to the terminal touch spot at any time during the touch. Thus, contactless interface 16 provides a very fast communications channel, but may not be currently suitable for processing in very short transaction times the required information for a highly secure transaction. As one skilled in the art will realize, however, these constraints for both contact and contactless interfaces are due to the limitations of currently available terminal and chip technology.

Contactless interface 16 preferably comprises a radio frequency (RF) antenna 58 having a coil of wire with an appropriate number of turns and diameter to tune the antenna to operate at a given frequency, such as 13.56 Mhz. Contactless interface 16 preferably meets the specifications for a contactless interface as set forth in the ISO standard number ISO 14443. Contactless RWD 20 has a corresponding contactless interface 64 having a similar RF antenna 66 tuned to operate at the same frequency. RF antenna 66 on contactless RWD 20 is powered by a local power supply 68 to generate an electromagnetic field, where some of the generated magnetic flux flows through RF antenna 66 on card 12 and thereby induces a voltage. The voltage drives an electrical current that powers microprocessor 24 and a system clock on card 12. Further, contactless RWD 20 may include a processor 70 and a memory 72 for processing and storing electrical signals and data representative of algorithms and applications used to communicate with card 12. The operating range of contactless interface 16 may vary, but preferably the contactless interface allows smart card 12 to communicate with a compatible contactless RWD 20 in a proximity range of at least about 10 cm. Utilization of contactless interface 16 is advantageous because the contactless interface does not require a physical engagement of card 12 to a contact RWD, and also because the rate of data transfer is faster, thereby improving throughput. Additionally, the use of contactless interface 16 beneficially avoids use of contact interface 14, reducing wear and tear and associated degradation of contacts plates 50. Further, similar to contact interface 14, communications utilizing contactless interface 16 are secured utilizing secret keys and encryption algorithms to protect access to CPU 38 and memory 26. Thus, the contactless functionality increases the convenience and ease of use of card 12.

Dual interface smart card 12 preferably comprises numerous applications for holding and exchanging value. As mentioned above, two types of such value-exchange applications are open purse application 28 and closed purse application 30, stored within microprocessor 24. There may be a plurality of each type of application 28 and 30 stored on a single smart card 12. The applications are preferably stored within EEPROM memory 48, thereby advantageously allowing the holder of smart card 12 to control the loading and unloading of the applications.

Open purse application 28 is an application that stores general value 32 that may be accessed by other applications to pay for all types of goods and services. Use of open purse application 28 is extremely flexible, as it may be accessed through either contact interface 14 or contactless interface 16, utilizing microprocessor 24 and secured by encryption capabilities performed by co-processor 42. Communications with open purse application 28 are in a common format, as is explained below, thereby allowing multiple external devices and applications to perform transactions utilizing the open purse application. Examples of a suitable open purse application 28 include VISA CASH® payments, Mondex® payment systems, and other similar applications that provide for the storage and exchange of general value 32.

Closed purse application 30 is an application that stores application-specific value 34 that may be accessed only by a specific application, or a limited number of specific applications, to pay for application-specific goods and services. Similar to open purse application 28, the use of closed purse application 30 is extremely flexible, as it may be accessed through either contact interface 14 or contactless interface 16, utilizing microprocessor 24 and secured by encryption capabilities performed by co-processor 42. According to the present invention, communications with closed purse application 30 are in a format compatible with the open purse application format, as is described in more detail below, thereby allowing multiple external devices programmed with the same application to perform transactions utilizing the closed purse application.

Each of the possible plurality of open purse application 28 and closed purse application 30 has an associated bin number, load key, unload key and purchase key. The bin number is a special number or other equivalent designator that is associated with a particular closed or open purse application. The bin number for each open or closed purse application is unique, and is associated with each transaction utilizing the application in order to properly settle the transaction. The load key, unload key and purchase key are used to control the input and removal of value. Only the load key associated with a particular application 28, 30 may be utilized to load value into that application. Similarly, only the unload key associated with a particular application 28, 30 may be utilized to unload value from that application to the cardholder's general account. The load key and unload key are typically controlled by a very secure, central host, such as that associated with a financial institution. Alternatively, the load key may be kept in the load device. Also, only the purchase key associated with a particular application 28, 30 may be utilized to remove value from that application in a purchase transaction. The present invention utilizes the various keys to control and restrict loads and purchases.

Associated with each type of application 28, 30 is an authentication system 80 (FIG. 4), such as a secure terminal in communication with a financial institution, that holds the specific load and unload key for that application. Similarly associated with each application 28, 30 may be a purchase system 82 (FIG. 4), such as a merchant terminal, that holds the purchase key for that application.

A load key and an unload key may be a very limited, highly secure key or a more easily obtained key. A limited key may include a load key associated with an open purse. A limited load key restricts the ability of loading general value 32, which may be utilized like cash, to only the special entities in the system that are authorized to distribute such value. Conversely, a more readily obtained load key may be a load key for some types of closed purse application 30. A more readily obtained load key may be desired in order to facilitate the loading of certain types of value into an application. For example, it may be desired to allow value from any open purse application or value from other designated closed purse applications to be readily transferred to and converted to application-specific value 34 in closed purse application 30. In this case, the load key for closed purse application 30 is readily obtainable, with the appropriate clearances, and stored within open purse application 28 and other closed purse applications in order to enable these applications to transfer value into closed purse application 30.

Similarly, the purchase keys associated with each application 28, 30 may be widely available or restricted. A purchase key associated with open purse application 28 is generally widely-available, therefore enabling the value in the open purse to be readily exchanged to anyone having the purchase key. On the other hand, the purchase key associated with closed purse application 30 is generally limited, with distribution of the purchase key only to entities associated with the specific application associated with the closed purse. So, for example, the purchase key for a transit application may only be contained within fare terminals, buses, subways, parking meters, etc. associated with the transit application. If a merchant terminal at a food store attempted to access the value stored in the transit application, then the merchant terminal would be denied because it would not contain the proper purchase key. Control over the load and purchase keys may also be advantageous in certain applications such as welfare programs, electronic benefits, entitlement programs, school lunch programs, and any other similar program where it is desirable to restrict the withdrawal of value from a specific closed purse application to a limited number of entities who would be given the purchase key for that application. Also, informal closed purse applications may be programmed on the smart card. These informal applications allow, for example, a parent to give a child the smart card with a predetermined value loaded in the purse, thereby limiting the amount the child may spend to the predetermined value. Similarly, other informal applications include a restricted access purse, such as for use only for a bus ride or a school lunch. More formal, restricted access applications include welfare, food stamps, special employee benefit applications, and other similar entitlement programs. Thus, the present invention utilizes control over the distribution of the load key and purchase key associated with each application 28, 30 to provide a robust, integrated system suited for all types of transactions.

For example, as mentioned above with open purse application 28, the load key is typically held within a host computer in a financial institution or within a remote terminal in a secure location or in the load device. In order to load value into open purse application 28, then, the card holder must place the card into communication with these funding sources.

An example of closed purse application 30 is a metropolitan transit application (MTA) 74 having a transit purse 76 that stores transit value 78 that may be used to pay for transit services. A transit service may include various services applicable to MTA 74, such as bus, train, subway, parking and toll charges. For example, a cardholder may load transit value 78 into transit purse 76, such as through the Internet or by using a contact or contactless smart card RWD 18 or 20, respectively. The cardholder may insert money into device 18, 20, enter a checking, savings or credit account number to debit, or access open purse application 28 to pay for a designated amount of transit value 78 to be transferred to transit purse 76. Then, when using the subway for example, the cardholder passes card 12 within the proximity of contactless smart card RWD 20. Card 12 and contactless RWD 20 interrogate each other for authentication and verification purposes, and then MTA 74 is utilized to initiate a transfer of transit value 78 to pay for the subway ride.

A number of alternatives exist for the fare determination and debiting: (1) debiting the card for a maximum fare upon entry, and then crediting the card an amount based upon the exit point or time; (2) partially debiting the card upon entry, such as with the minimum fare, and then further debiting the card upon exiting, if necessary, based on distance or time; and (3) placing a data tag in the card indicating the entry time and/or entry point, and then recalling this entry data tag and comparing it to a similar exit data tag to determine the fare and debit the card. Many other similar fare determination methods will be evident to one skilled in the art.

Also, MTA 74 may support a negative value operation. For example, MTA 74 comprises a transit product file having a record which corresponds to open purse application 28. This is where, for example, the entry data tag and exit data tag discussed above may be managed. For example, in the fare by distance scenario, the interaction between the card and the terminal device at the entry point, through MTA 74, can identify value in a purse. MTA 74 identifies that sufficient value to gain entry exists within either the closed purse application 30 or open purse application 28. Upon exiting, MTA 74 compares exit data tag and entry data tag and determines the fare. If closed purse application 30 or open purse application 28 contains sufficient value to cover the fare, then the fare is debited and the cardholder exits normally. If sufficient value does not exist on the card, then the cardholder is notified of the deficiency, such as by an audible or visual indicator, and then permitted to exit. A record of the deficiency, however, is kept within MTA 74. The cardholder can then use a normal load-value machine to add value to the appropriate purse 28 and/or 30. The next time the cardholder uses a purse 28, 30 to pay for a ride the deficiency is collected before the current fare is deducted.

Since the cards are purchased at a fixed price, it is not likely that a rider would dispose of their card just because of the negative balance. Card replacement is more expensive than paying-off the negative balance. Also, paying-off the negative value is encouraged by the price differential between minimum and maximum fares, where the price differential is typically less than the fixed price of a card. Thus, it is believed that the risk for loss based on negative value operations is low.

Also, negative value operation improves service levels and rider throughput compared with the current systems. Looking at the queuing model for gated operations, people tend to arrive at random intervals, where the concentrations varying by time of day and local event schedules. On exit, however, the distribution has more peaks. The peaks are associated with the arrival of a transit vehicle and the massive queuing of riders immediately after debarkation.

Furthermore, this system is advantageous in that no actual financial transaction is required at the point of entry.

Once the fare amount is determined, MTA 74 debits transit purse 76 for an amount of transit value 78 associated with the fare, and transfers that amount of transit value 78 relating to the fare to contactless RWD 20. In turn, contactless RWD 20 may transfer all of the collected transit value 78 to back end computer systems 22 associated with the authority controlling the transit service. As one skilled in the art will realize, similar transactions may also occur utilizing contact RWD 18.

In a case where insufficient transit value 78 exists in transit purse 76 to pay for the fare, MTA 74 may then look to open purse application 28 to make up for the discrepancy. MTA 74 may debit the amount of general value 32 in open purse application 28 by an amount corresponding to the deficient amount of transit value 78. The debited amount of general value 32 is then transferred to contactless RWD 20 and back end computer systems 22. Alternatively, the cardholder may have an auto-load application 79 associated with the closed purse application 30, such as the MTA 74. In this case, auto-load application 79 provides capability to load a previously agreed-upon amount of application-specific value 34 to closed purse application 30. The auto-load amount of value transferred to closed purse application 30 may come directly from the general value 32 stored in open purse application 28. Alternatively, the auto-load amount of value may be similar to a pre-approved credit that is debited to a checking, savings, credit, debit or loan account through a (off-line or on-line) terminal interface. Auto-load application 79 may similarly be incorporated with open purse application 28. Thus, auto-load application 79 provides worry-free use of card 12, as it guarantees that an appropriate amount of general value and/or application-specific value will always be available to the cardholder.

Figure 3:
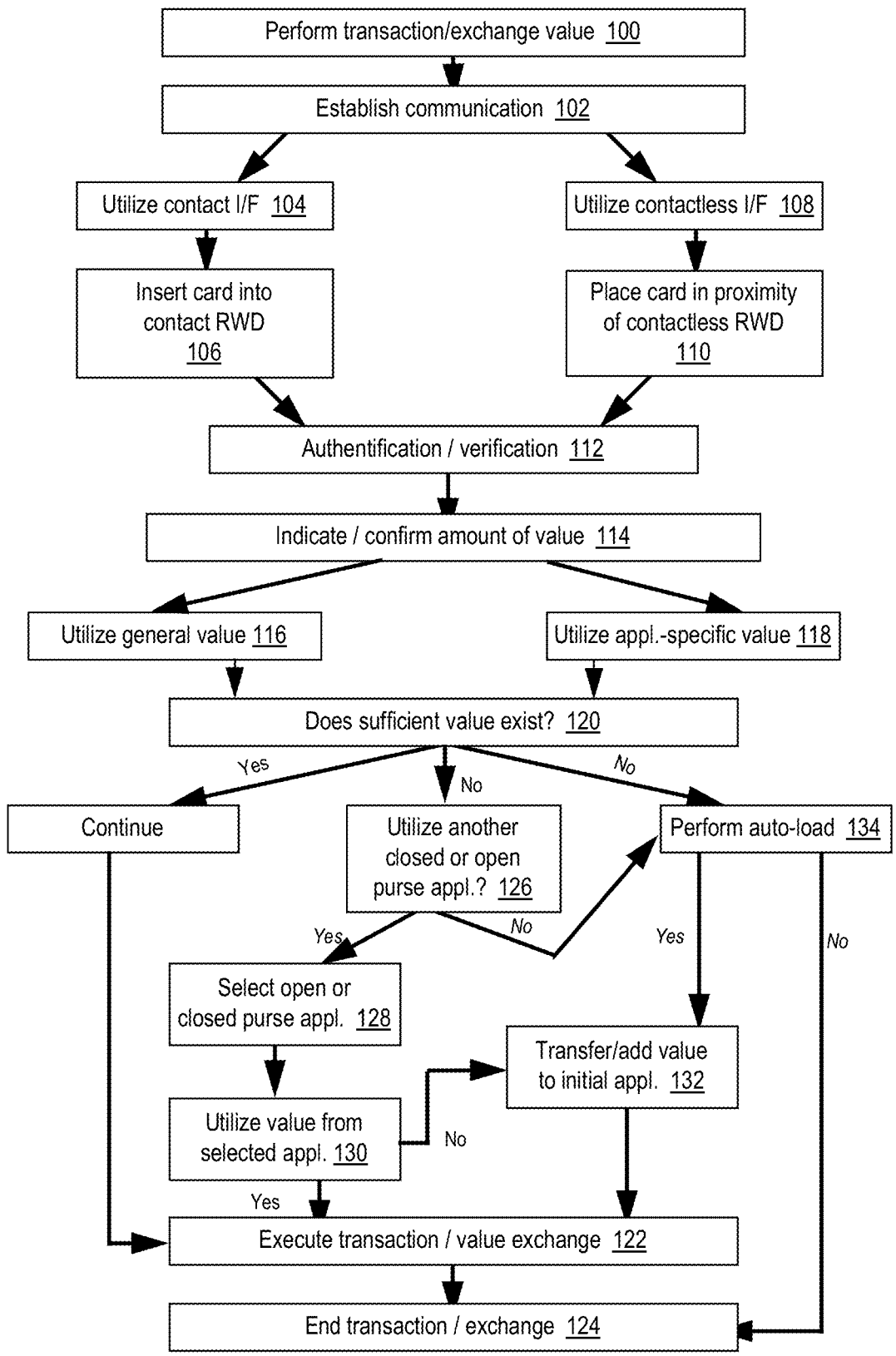
FIG. 3 is a flow chart representing steps in performing a typical value-exchange transaction utilizing the system and apparatus of the present invention.

In operation, referring to FIG. 3, a typical value exchange transaction utilizing system 10 and smart card 12 may comprise performing a financial transaction at a merchant, over the Internet, at a local terminal or with another cardholder utilizing a RWD (block 100). A communication channel must be established between smart card 12 and the corresponding device (block 102). To establish the communication channel, the cardholder engages contact interface 14 into contact RWD 18 (blocks 104 and 106) or places contactless interface 16 in proximity of contactless RWD 20 (blocks 108 and 110). A bi-directional communication then proceeds between card 12 and the respective RWD 18 or 20 that authenticates and verifies both the card the respective device (block 112). At this point, the cardholder may indicate the amount of value involved in the financial transaction, such as if the cardholder is loading value onto the card or if a card-to-card value exchange is being performed (block 114). Alternatively, the cardholder may confirm the amount of value involved in the transaction, such as if utilizing card 12 in a merchant or Internet transaction. Similarly, this part of the transaction process may be implied, such as in transportation-related applications where a toll or fare may be charged depending upon distance traveled, time of day, customer status (i.e. senior citizen discount, preferred traveler), etc. Next, a choice may be made to utilize general value 32 from open purse application 28 or application-specific value 34 from closed purse application 30 (blocks 116 and 118). Again, this choice may be predetermined, depending on the application with which smart card 12 is interacting.

For example, in utilizing smart card 12 in a subway, the interacting RWD at an entry gate may automatically initiate a transportation application, such as MTA 74, and hence initially look to use application-specific value 34, such as transit value 38. In contrast, when inserting smart card 12 into a multi-functional terminal device having contact interface 14, the cardholder may be given a choice by the application program within the terminal device as to which type of value should be utilized.

In either case, system 10 and the application program utilized inquire about the availability of sufficient value in the chosen application (block 120). If sufficient value exists, then the transaction is executed and the value exchange is performed and the transaction ends (blocks 122 and 124). If sufficient value does not exist, then the application may permit value from another closed or open purse application to be utilized (block 126). This option may be application-specific as some forms of value may not be convertible, or may have a limited ability to be converted. For example, application-specific value 34 stored in a closed purse application 30 such as for entitlement programs, like a welfare program, may be restricted so that the value can only be used for transactions utilizing the closed purse application. If another application is permitted to be utilized, then the open or closed purse application may be chosen automatically, based on a pre-designation, or the cardholder may indicate which application to use (block 128). The value from the selected application may then be directly utilized to execute and end the transaction (blocks 130, 122 and 124), or it may be converted to value to be stored in the initial application and then utilized to execute and end the transaction (blocks 132, 122 and 124). Alternatively, if another closed or open purse application is not chosen or permitted to be utilized, another option may be to perform the auto-load function, as described above (block 134). If the auto-load is permitted and/or chosen, then value is added to the initial application and the transaction is executed and ended (blocks 132, 122 and 124). If the auto-load is not permitted and/or not chosen, then the transaction is ended (block 124). Thus, system 10 provides a simple, convenient and fast value exchange transaction utilizing dual interface smart card 12.

As one skilled in the art will realize, MTA 74 is but one example of a multitude of applications that may be stored on card 12. Card 12 may further include applications relating to identification, building entry authorization, access to equipment such as computers, general financial transactions, loyalty applications, ticketing and membership applications, entitlement programs, various other transit applications relating to planes, taxis, shuttles, tolls, etc., employer programs that distribute benefits/entitlements, and many other similar applications.

For example, according to the present invention, a loyalty application 81 may be implemented in association with MTA 74, for example. Loyalty application 81 comprises an application programmed to interact with MTA 74 to keep track of usage by a particular card holder. Loyalty application 81 may track, for example, the number of times a cardholder has paid for a ride, such as on a subway. Upon reaching a predetermined number of paid rides in a certain period of time, such as 15 rides in a month, then loyalty application 81 authorizes the equivalent of a pass to ride free for a certain time period or for a certain number of rides, such as for the remainder of the month or for two free rides. Loyalty application 81 advantageously may be linked to each purse application within smart card 12, thereby leveraging the infrastructure of the loyalty application for all applications. This enables one smart card 12 to be utilized for all the needs of a cardholder, eliminating the nuisance of having to carry a different card for each loyalty program.

Thus, the loyalty program of the present invention beneficially is integrated with each purse application 28, 30 on smart card 12.

The loading of the pass or number of free rides may be accomplished by the associated program within the terminal with which the card is interacting. For example, the terminal may read the card, accessing a loyalty register that maintains transaction information related to the card usage for the particular loyalty program. The terminal program may then comprise a mechanism to evaluate the dates and the transaction data to determine if any entitlement has been earned. The terminal program may then load the entitlement onto the card into the proper application. Alternatively, when an entitlement has been earned, the loyalty program may set a bit on the card that indicates a certain "free ride" time period or a certain number of free rides. By centrally locating the evaluation mechanism in the terminal or with a host computer, the parameters for various programs can be quickly and easily changed.

Another advantageous feature of the present invention is the integration of open purse application 28 and closed purse application 30 into a single system. As mentioned above, this is accomplished by structuring closed purse application 30 to be compatible with open purse application 28. Compatibility is enabled by structuring the data and transaction information for a particular closed purse application 30 in a format compatible with the data and transaction information utilized by the particular open purse application 28 being utilized. An identification number associated with the card is preferably used to properly direct the closed purse application transaction information through the established back end computer systems 22 utilized by the particular open purse system application 28. In multi-application environments the reference numbers associated with an individual card can become quite complex. The card itself, or more specifically, the chip silicon has an embedded serial number. This is useful for identifying that piece of silicon. However, each application that is loaded onto the card can also have an identification number attached to it. This is necessary in the case of transaction-based applications, such as in the Visa Cash® system where the identification number is akin to an account number, such that the devices and backend systems can specifically identify and track each instance of the product that has been issued. Visa breaks up this number into two parts, a BIN which identifies the issuer and a specific program of that issuer and a sequence number which is the individual instance of that product. Therefore, the identification number may include the BIN number and the application instance number, for example. As an open purse application 28 like VISA CASH® gains national and worldwide acceptance, this compatible structure between open and closed purses powerfully enables smart card 12 of the present invention to be utilized for virtually all transactions a cardholder may wish to perform. Thus, the value-exchange transactions, including those involving application-specific value, preferably are managed by the open purse application transaction system.

Figure 4:
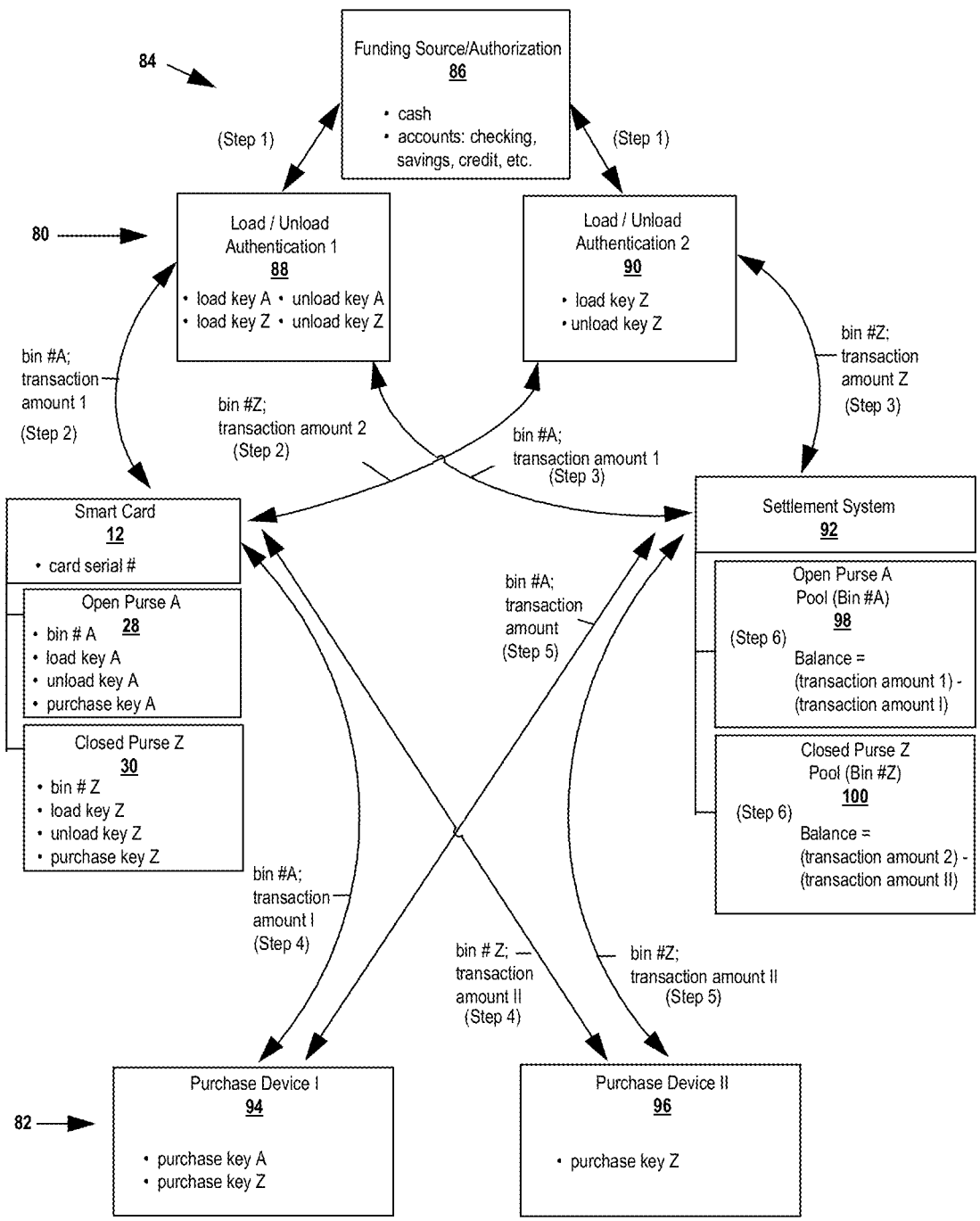
FIG. 4 is a schematic representation of a transaction network according to the present invention.

Referring to FIG. 4, one embodiment of a high level process flow according to the present invention comprises back end computer systems 22 (not shown) as part of a load/purchase transaction. Back end computer systems 22 may comprise a settlement system 92 in a transaction network 84 for properly settling transactions performed utilizing open purse application 28 and closed purse application 30 on smart card 12. Transaction network 84 comprises interface and/or connecting networks for performing value exchange transactions. Suitable examples of transaction network 84 comprise networks managed by VISA®, such as the PLUS® network for ATM transactions and VISANET® network for point-of-sale (POS) transactions.

Before smart card 12 can be utilized to perform a value exchange transaction, it must be loaded with value. To load smart card 12 with value, it may need to be in communication with funding source 86 through transaction network 84. To accomplish this, smart card 12 may be inserted into an on-line or remote terminal interface device (not shown) in communication with funding source 86. Funding source 86 may comprise a terminal interface or other similar device having access to funds, such as cash that can be inserted into the terminal device or account numbers that can be debited, in exchange for general value 32 (FIG. 1) and/or application-specific value 34 (FIG. 1). Further, funding source 86 comprises the process to communicate with authorization system 80 to authorize the disbursement of value in exchange for funds (Step 1). Authorization system 80 may comprise a first load/unload authentication source 88 having the load keys A and Z for both an open purse application 28 (load key A) and a closed purse application 30 (load key Z). For example, first load/unload authentication source 88 may comprise a financial institution or the government. Also, authentication system 80 may comprise a second load/unload authentication source 90, having only load key Z for closed purse application 30. For example, second load/unload authentication source 90 may comprise a private authority that manages a particular closed purse application, like MTA 74. Authorization system 80 interacts with smart card 12 to transfer value to applications 28, 30 (Step 2) based on the amount of funds transferred to funding source 86. For example, the bin number and transaction amount associated with each transaction may be part of the transaction information that is ultimately sent to settlement system 92 as part of the settlement process (Step 3).

Once smart card 12 is loaded with value, then it can be utilized in value exchange transactions within purchase system 82 (Step 4) or within other unload systems (not shown), such as with the government and financial institutions. Purchase system 82 may comprise a first purchase device 94 having the purchase keys A and Z for both open purse application 28 (load key A) and closed purse application 30 (load key Z). For example, first purchase device 94 may comprise a terminal associated with a particular closed purse application, like MTA 74. Also, purchasing system 82 may comprise a second purchasing device 96, having only load key Z for closed purse application 30. For example, second purchase device 96 may comprise a point-of-sale merchant terminal at a grocery store where purchase key Z is associated with a closed purse application such as electronic food stamps. In this example, the distribution of purchase key Z is limited only to approved grocery stores so that the value in the electronic food stamp application may not be used for any purchases other than food. Purchasing system 82 interacts with smart card 12 to transfer value from applications 28, 30 (Step 4) based on the transaction amount. For example, the bin number and transaction amount associated with each transaction may be part of the transaction information that is ultimately sent to settlement system 92 as part of the settlement process (Step 5). The lines having double-arrowheads between settlement system 92 and both authentication system 80 and purchasing system 82 represent the accounting performed by the system to properly settle all of the transactions. For example, upon receiving funds from funding source 86, load/unload authentication sources 88 and 90 may transfer the funds to settlement system 92 for allocation to open purse pool 98 or closed purse pool 100, depending in the bin number associated with the transaction. Upon receiving the transaction information from purchasing devices 94 and 96, settlement system 92 then debits the appropriate pool 98 or 100 and credits the appropriate purchasing device based on the transaction amount and bin number associated with the purchase transaction. Settlement system 92 then balances the value in each pool (Step 6). Alternatively, load/unload authentication sources 88 and 90 may keep the value but send an accounting to settlement system 92. Upon resolving a purchase transaction, settlement system 92 may then debit the appropriate load/unload authentication source 88, 90, based on the transaction amount and the associated bin number, and credit the appropriate purchasing device 94, 96. As discussed above, the present invention advantageously provides for the seamless use of either open purse application 28 or closed purse application 30 within transaction network 84, as all transactions are formatted to be compatible with the settlement system 92 of the back end computer systems 22 of the open purse application.

Although the invention has been described with reference to these preferred embodiments, other embodiments can achieve the same results. Variations and modifications of the present invention will be apparent to one skilled in the art and the following claims are intended to cover all such modifications and equivalents.

What is claimed is:

1. A computer-implemented method comprising:
controlling, by a dual-interface processor, a value exchange through a plurality of contactless interfaces by executing computer readable instructions comprising:
receiving, by the dual-interface processor through a first contactless interface, a first wireless communication at an entry location from a transaction card, the transaction card having a first electronic application for storing application-specific value on the transaction card and a second electronic application for storing general value on the transaction card, wherein the first wireless communication comprises account information about the application-specific value and the general value;
receiving, by the dual-interface processor from the first contactless interface, verification of authentication of the transaction card through short range signaling between the first contactless interface and the transaction card, wherein the dual-interface processor causes a debit of a fee from the application-specific value of the transaction card upon receiving the first wireless communication at the entry location;
receiving, by the dual-interface processor through a second contactless interface, a second wireless communication at an exit location from the transaction card; and
receiving, by the dual-interface processor from the second contactless interface, verification of authentication of the transaction card through short range signaling between the second contactless interface and the transaction card.

2. The method according to claim 1, wherein the entry location is a transit entry location, and the exit location is a transit exit location.

3. The method according to claim 2, wherein the fee is based upon the time between the first wireless communication and second wireless communication.

4. The method according to claim 2, wherein the fee is determined at the entry location.

5. The method according to claim 1, further comprising:
determining if the application-specific value is less than the fee; and
debiting the fee from the general value if the application-specific value is less than the fee.

6. The method according to claim 1, wherein the first wireless communication or the second wireless communication is received from the transaction card using a contactless interface.

7. The method according to claim 1, wherein the entry location is a parking entry location, and the exit location is a parking exit location.

8. A computer-implemented method comprising:
controlling, by a dual-interface processor, a value exchange through a plurality of contactless interfaces by executing computer readable instructions comprising:
receiving, by the dual-interface processor through a first contactless interface, a first wireless communication at an entry location from a transaction device containing a chip, the transaction device having a first electronic application for storing application-specific value on the transaction card and a second electronic application for storing general value on the transaction card, wherein the first wireless communication comprises account information about the application-specific value and the general value;
receiving, by the dual-interface processor from the first contactless interface, verification of authentication of the transaction device through short range signaling between the first contactless interface and the transaction device, wherein the dual-interface processor causes a debit of a fee from the application-specific value of the transaction device upon receiving the first wireless communication at the entry location;
receiving, by the dual-interface processor through a second contactless interface, a second wireless communication at an exit location from the transaction device, wherein the second wireless communication comprises the account information about the application-specific value and the general value; and
receiving, by the dual-interface processor from the second contactless interface, verification of authentication of the transaction device through short range signaling between the second contactless interface and the transaction device.

9. The method according to claim 8, wherein the entry location is a transit entry location, and the exit location is a transit exit location.

10. The method according to claim 9, wherein the fee is based upon the time between the first wireless communication and second wireless communication.

11. The method according to claim 9, wherein the fee is based upon the distance between the entry location and the exit location.

12. The method according to claim 8, further comprising:
determining if the application-specific value is less than the fee; and
debiting the fee from the general value if the application-specific value is less than the fee.

13. The method according to claim 8, further comprising:
determining if the application-specific value is less than the additional fee; and
debiting the additional fee from the general value if the application-specific value is less than the additional fee.

14. The method according to claim 8, wherein the first wireless communication or the second wireless communication is received from the transaction device using a contactless interface.

15. A computer-implemented method comprising:
controlling, by a dual-interface processor, a value exchange through a plurality of contactless interfaces by executing computer readable instructions comprising:
receiving, by the dual-interface processor through a first contactless interface, a first wireless communication at an entry location from a transaction device, the transaction device having a first electronic application for storing application-specific value on the transaction device and a second electronic application for storing general value on the transaction device, wherein the first wireless communication comprises account information about the application-specific value and the general value;
receiving, by the dual-interface processor from the first contactless interface, verification of authentication of the transaction card through short range signaling between the first contactless interface and the transaction device;
transmitting, by the dual-interface processor, a first data tag to the transaction device for storage in the transaction device, wherein the first data tag comprises information representative of the entry location;
receiving, by the dual-interface processor through a second contactless interface, a second wireless communication at an exit location from the transaction device, wherein the second wireless communication comprises the account information about the application-specific value and the general value;
receiving, by the dual-interface processor from the second contactless interface, verification of authentication of the transaction device through short range signaling between the second contactless interface and the transaction card;
transmitting, by the dual-interface processor, a second data tag to the transaction device for storage in the transaction card, wherein the second data tag comprises information representative of the exit location, wherein
the dual-interface processor compares the first data tag from the transaction card with the second data tag from the transaction device at the exit location to determine a fee to debit from the application-specific value of the transaction device.

16. The method according to claim 15, wherein the fee is based upon the time between the first wireless communication and second wireless communication.

17. The method according to claim 15, wherein the fee is based upon the distance between the entry location and the exit location.

18. The method according to claim 15, wherein the information representative of the entry location comprises an entry time.

19. The method according to claim 15, further comprising:
determining if the application-specific value is less than the fee; and
debiting the fee from the general value if the application-specific value is less than the fee.

20. The method according to claim 15, wherein the first wireless communication or the second wireless communication is received from the transaction card using the contactless interface.

* * * * *